(12) United States Patent
Thangarasa et al.

(10) Patent No.: US 9,918,266 B2
(45) Date of Patent: Mar. 13, 2018

(54) ACTIVATION AND DEACTIVATION OF A SECONDARY CELL FOR DEVICE-TO-DEVICE USER EQUIPMENT

(71) Applicant: Telefonaktiebolaget L M Ericsson (publ), Stockholm (SE)

(72) Inventors: Santhan Thangarasa, Vällingby (SE); Muhammad Kazmi, Bromma (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 14/420,781

(22) PCT Filed: Dec. 19, 2014

(86) PCT No.: PCT/SE2014/051556
§ 371 (c)(1),
(2) Date: Feb. 10, 2015

(87) PCT Pub. No.: WO2016/056968
PCT Pub. Date: Apr. 14, 2016

(65) Prior Publication Data
US 2016/0100345 A1  Apr. 7, 2016

Related U.S. Application Data

(60) Provisional application No. 62/060,330, filed on Oct. 6, 2014.

(51) Int. Cl.
*H04W 36/22* (2009.01)
*H04W 36/00* (2009.01)
(Continued)

(52) U.S. Cl.
CPC ............... *H04W 36/22* (2013.01); *H04L 5/00* (2013.01); *H04W 72/0453* (2013.01); *H04W 36/0083* (2013.01); *H04W 72/0486* (2013.01)

(58) Field of Classification Search
CPC . H04W 4/005; H04W 8/005; H04W 36/0083; H04W 36/04; H04W 36/22;
(Continued)

(56) References Cited

U.S. PATENT DOCUMENTS 8,457,639 B2 * 6/2013 Gazzard .................. H04L 47/10
455/436
8,839,362 B2 * 9/2014 Jung ...................... H04L 9/0844
726/2

(Continued)

FOREIGN PATENT DOCUMENTS

WO  WO 2013/091229 A1  6/2013
WO  WO 2013/162333 A1  10/2013

OTHER PUBLICATIONS

Czech Technical University, R2-133846: Dynamic selection between D2D and cellular mode during D2D communication, Nov. 15, 2013, 3GPP TSG-RAN WG2 # 84, pp. 1-2.*

(Continued)

*Primary Examiner* — Eric Nowlin
(74) *Attorney, Agent, or Firm* — Baker Botts, LLP

(57) ABSTRACT

According to some embodiments, a wireless communication device capable of device-to-device, D2D, operation is configured with at least one secondary cell, SCell. The wireless communication device receives a command from a network node to activate or deactivate the SCell. The wireless communication device determines at least its D2D traffic activity level and determines whether to apply or ignore the received command based at least in part on the determined D2D traffic activity level.

26 Claims, 9 Drawing Sheets

(51) Int. Cl.
*H04L 5/00* (2006.01)
*H04W 72/04* (2009.01)

(58) Field of Classification Search
CPC ............ H04W 72/04; H04W 72/0406; H04W 72/0446; H04W 72/0453; H04W 72/048; H04W 72/0486; H04W 72/1289; H04W 76/023; H04W 84/12; H04W 92/18; H04W 76/046; H04W 88/06; H04L 5/00
See application file for complete search history.

(56) References Cited

U.S. PATENT DOCUMENTS

| | | | |
|---|---|---|---|
| 8,855,645 B2* | 10/2014 | Bienas | 455/426.1 |
| 9,084,222 B2* | 7/2015 | Chai | H04W 76/02 |
| 9,264,968 B2* | 2/2016 | Tabet | H04W 36/30 |
| 9,276,708 B2* | 3/2016 | Hakola | H04L 5/001 |
| 9,313,607 B2* | 4/2016 | Dimou | H04W 4/005 |
| 9,351,317 B2* | 5/2016 | Jamadagni | H04W 74/04 |
| 9,560,682 B2* | 1/2017 | Li | H04W 72/06 |
| 9,713,124 B2* | 7/2017 | Chae | H04L 5/0044 |
| 9,717,068 B2* | 7/2017 | Graham | H04W 68/02 |
| 2007/0055862 A1* | 3/2007 | Sharma | H04L 63/0464 / 713/150 |
| 2010/0279672 A1* | 11/2010 | Koskela | H04W 36/30 / 455/418 |
| 2011/0151887 A1 | 6/2011 | Hakola et al. | |
| 2011/0261790 A1* | 10/2011 | Gazzard | H04L 47/10 / 370/332 |
| 2011/0300858 A1* | 12/2011 | Lee | H04W 28/10 / 455/425 |
| 2012/0093098 A1* | 4/2012 | Charbit | H04W 72/04 / 370/329 |
| 2012/0117155 A1* | 5/2012 | Li | H04W 72/06 / 709/205 |
| 2013/0016666 A1* | 1/2013 | Chen | H04W 72/1231 / 370/329 |
| 2013/0178221 A1* | 7/2013 | Jung | H04L 9/0844 / 455/450 |
| 2013/0322276 A1* | 12/2013 | Pelletier | H04W 72/085 / 370/252 |
| 2014/0038653 A1* | 2/2014 | Mildh | H04W 28/048 / 455/501 |
| 2014/0135019 A1* | 5/2014 | Jang | H04W 76/043 / 455/437 |
| 2014/0179330 A1* | 6/2014 | Du | H04W 76/043 / 455/450 |
| 2014/0206322 A1* | 7/2014 | Dimou | H04W 4/005 / 455/414.1 |
| 2014/0254523 A1* | 9/2014 | Chai | H04W 76/02 / 370/329 |
| 2014/0308954 A1* | 10/2014 | Wang | H04W 36/165 / 455/436 |
| 2014/0321314 A1* | 10/2014 | Fodor | H04W 72/085 / 370/252 |
| 2015/0009871 A1* | 1/2015 | Shousterman | H04W 16/06 / 370/280 |
| 2015/0119056 A1* | 4/2015 | Lee | H04W 72/042 / 455/450 |
| 2015/0141000 A1* | 5/2015 | Yilmaz | H04W 76/023 / 455/426.1 |
| 2015/0230112 A1* | 8/2015 | Siomina | G01S 5/0205 / 370/252 |
| 2015/0230142 A1* | 8/2015 | Yang | H04W 36/00 / 370/331 |
| 2015/0257160 A1* | 9/2015 | Ishida | H04W 72/0486 / 455/452.1 |
| 2015/0305079 A1* | 10/2015 | Wu | H04W 76/023 / 370/329 |
| 2015/0317392 A1* | 11/2015 | Fernandez | G06F 17/30017 / 707/621 |
| 2015/0326360 A1* | 11/2015 | Malladi | H04L 5/0032 / 370/329 |
| 2015/0382252 A1* | 12/2015 | Yu | H04W 8/005 / 370/331 |
| 2016/0007183 A1* | 1/2016 | Fujishiro | H04W 8/005 / 455/426.1 |
| 2016/0007372 A1* | 1/2016 | Fujishiro | H04W 8/005 / 370/329 |
| 2016/0021594 A1* | 1/2016 | Yilmaz | H04W 36/30 / 370/332 |
| 2016/0029429 A1* | 1/2016 | Peng | H04W 36/00 / 370/329 |
| 2016/0044666 A1* | 2/2016 | Shin | H04W 76/023 / 370/336 |
| 2016/0073285 A1* | 3/2016 | Graham | H04W 68/02 / 370/328 |
| 2016/0119738 A1* | 4/2016 | Hampel | H04W 8/005 / 370/329 |
| 2016/0150504 A1* | 5/2016 | Chae | H04L 5/0044 / 375/133 |
| 2016/0165510 A1* | 6/2016 | Jun | H04W 36/22 / 370/230 |
| 2016/0183241 A1* | 6/2016 | Lee | H04W 76/023 / 455/425 |
| 2016/0234718 A1* | 8/2016 | Thangarasa | H04W 8/005 |
| 2016/0242229 A1* | 8/2016 | Balachandran | H04W 72/0406 |
| 2016/0353342 A1* | 12/2016 | Futaki | H04W 4/005 |
| 2016/0381630 A1* | 12/2016 | Krishnamoorthy | H04W 36/08 / 370/329 |
| 2017/0006630 A1* | 1/2017 | Wang | H04W 72/1289 |
| 2017/0026895 A1* | 1/2017 | Murakami | H04W 40/20 |
| 2017/0041918 A1* | 2/2017 | Lee | H04B 7/26 |
| 2017/0111946 A1* | 4/2017 | Cheng | H04W 76/023 |
| 2017/0142766 A1* | 5/2017 | Kim | H04W 36/00 |
| 2017/0150501 A1* | 5/2017 | Park | H04W 72/0446 |
| 2017/0164313 A1* | 6/2017 | Guo | H04W 56/0025 |
| 2017/0223711 A1* | 8/2017 | Wang | H04W 36/0005 |
| 2017/0279505 A1* | 9/2017 | Zhang | H04B 7/26 |

OTHER PUBLICATIONS

Doppler et al., Device-to-Device Communication as an Underlay to LTE-Advanced Networks, Dec. 2009, IEEE Communications Magazine, pp. 42-49.*

Ericsson, 3GPP TSG-RAN WG2 #71 Tdoc R2-104771: Delay in applying the deactivation command, Aug. 27, 2010, pp. 1-3.*

PCT Notification of Transmittal of the International Search Report and the Written Opinion of the International Searching Authority, or the Declaration for International application No. PCT/SE2014/051556, dated Jul. 13, 2015.

* cited by examiner

ACTIVATION AND DEACTIVATION OF A SECONDARY CELL FOR DEVICE-TO-DEVICE USER EQUIPMENT

PRIORITY

This nonprovisional application is a U.S. National Stage Filing under 35 U.S.C. § 371 of International Patent Application Serial No. PCT/SE2014/051556 filed Dec. 19, 2014, and entitled "Activation and Deactivation of a Secondary Cell for Device-to-Device User Equipment" and U.S. Provisional Patent Application No. 62/060,330 filed Oct. 6, 2014, both of which are hereby incorporated by reference in their entirety.

TECHNICAL FIELD

Certain embodiments relate, in general, to wireless communications and, more particularly, to methods for activation and deactivation of a secondary cell for device-to-device, D2D, user equipment.

BACKGROUND

A wireless communication device configured for multi-carrier operation can receive data from and/or transmit data to more than one serving cell. Multi-carrier operation may be interchangeably referred to as "carrier aggregation," "multi-carrier system," "multi-cell operation," "multi-carrier transmission," and/or "multi-carrier reception." Multi-carrier operation can be configured for transmission of signalling and/or data in the uplink direction, the downlink direction, or both.

In multi-carrier operation, an individual carrier may be referred to as a component carrier, and each serving cell may have an associated component carrier. One of the component carriers is the primary component carrier, PCC, which may be interchangeably referred to as the primary carrier or anchor carrier. The PCC's serving cell is interchangeably called the primary cell, PCell, or primary serving cell, PSC. The remaining component carriers are called secondary component carriers, SCCs, which may be interchangeably referred to as secondary carriers or supplementary carriers. The SCC's serving cell is interchangeably called a secondary cell, SCell, or a secondary serving cell, SSC.

Generally the primary carrier carries the essential signalling that is specific to the wireless communication device. The primary carrier exists in both the uplink and downlink directions. Thus, if there is only a single uplink component carrier, the PCell is on that component carrier. The network may assign different primary carriers to different wireless communication devices operating in the same sector or cell.

A network node uses a multi-carrier SCell setup procedure to at least temporarily setup or release an SCell for a wireless communication device capable of multi-carrier operation. The SCell may be setup or released in the downlink, uplink, or both. Examples of commands that the network can use in the multi-carrier SCell setup procedure include Configuration of SCell(s), De-configuration of SCell(s), Activation of SCell(s), and Deactivation of SCell(s).

The configuration procedure is used by the serving radio network node (e.g., eNode B in LTE) to configure a carrier aggregation capable wireless communication device with one or more SCells in the downlink, uplink, or both. The de-configuration procedure is used by the serving radio network node to de-configure or remove one or more already configured SCells in the downlink, uplink, or both. The configuration or de-configuration procedure can also be used to change the current multi-carrier configuration. For example, the number of SCells can be increased or decreased, or existing SCells can be swapped with new ones.

The serving radio network node can activate one or more deactivated SCells or deactivate one or more SCells on the corresponding configured secondary carriers. The PCell is always activated. The configured SCells are initially deactivated upon addition and after a cell change, such as a handover. In LTE, the activation and deactivation command is sent by the eNode B via a media access control—control element, MAC-CE. The deactivation of SCell saves the wireless communication device's battery power.

The SCell activation delay requirements are defined in TS 36.133 release 10. According to which, upon receiving SCell activation command in subframe n, the wireless communication device shall be capable to transmit a valid channel state information, CSI, report and apply actions related to the activation command for the SCell being activated no later than in subframe n+24 provided the following conditions are met for the SCell: 1) during the period equal to max(5 measCycleSCell, 5 DRX cycles) before the reception of the SCell activation command, (a) the wireless communication device has sent a valid measurement report for the SCell being activated, and (b) the SCell being activated remains detectable according to the cell identification conditions, and 2) the SCell being activated also remains detectable during the SCell activation delay according to the cell identification conditions. Otherwise upon receiving the SCell activation command in subframe n, the wireless communication device shall be capable to transmit a valid CSI report and apply actions related to the activation command for the SCell being activated no later than in subframe n+34 provided the SCell can be successfully detected on the first attempt.

The SCell deactivation delay requirements are also defined in TS 36.133 release 10. According to which, upon receiving SCell deactivation command or upon expiry of the sCellDeactivationTimer in subframe n, the wireless communication device shall accomplish the deactivation actions for the SCell being deactivated no later than in subframe n+8.

Certain wireless communication devices capable of SCell operation may also be capable of device-to-device, D2D, operation. Although the PCell and the SCells are primarily used for WAN operations, such as the reception and/or transmission of cellular signals, D2D capable wireless communication devices can be configured for D2D operation on PCell and/or on one or more SCells.

A D2D wireless communication device transmits D2D signals or channels in the uplink part of the spectrum. D2D operation by a wireless communication device is in a half-duplex mode, meaning that the wireless communication device can either transmit D2D signals/channels or receive D2D signals/channels. There may also be D2D relay wireless communication devices that may relay some signals to other D2D wireless communication devices.

Certain control information for D2D operation may be transmitted by D2D wireless communication devices. Other control information may be transmitted by radio network nodes. For example, D2D resource grants for D2D communication may be transmitted via cellular downlink control channels. The D2D transmissions may occur on resources which are configured by the network or selected autonomously by the D2D wireless communication device.

D2D communication implies that a D2D transmitter transmits information to assist D2D receivers in receiving D2D data. The information includes the D2D data and D2D communication control information with scheduling assignments. The D2D data transmissions are according to configured patterns and in principle may be transmitted rather frequently. Scheduling assignments are transmitted periodically. D2D transmitters that are within the network coverage may request eNodeB resources for their D2D communication transmissions and receive in response D2D resource grants for scheduling assignments and D2D data. Furthermore, the eNodeB may broadcast D2D resource pools for D2D communication.

D2D discovery messages are transmitted in infrequent periodic subframes. The eNodeBs may broadcast D2D resource pools for D2D discovery, both for reception and transmission.

The D2D communication supports two different modes of D2D operation: mode 1 and mode 2. In mode 1, the location of the resource for transmission of the scheduling assignment by the broadcasting wireless communication device comes from the eNodeB. The location of the resource(s) for transmission of the D2D data by the broadcasting wireless communication device also comes from the eNodeB. In mode 2, a resource pool for scheduling assignment is pre-configured and/or semi-statically allocated. The wireless communication device on its own selects the resource for scheduling assignment from the resource pool.

When the wireless communication device switches its reception from D2D reception to wireless access network, WAN, reception (e.g., cellular network reception) or from WAN reception to D2D reception, PCell interruption of 1 subframe occurs. This is because the wireless communication device receiver chain needs to be retuned every time the operation is switched from WAN to D2D reception and from D2D to WAN reception. This applies to both D2D discovery and D2D communication capable wireless communication devices.

It is important to partition resources between uplink cellular and D2D and to schedule the wireless communication device for WAN and D2D in such a way that avoids or minimizes the risk of switching taking place in certain subframes. For example, in LTE subframe #0 and/or subframe #5 of the PCell contain essential information, such as primary synchronization signals, PSS, and secondary synchronization signals, SSS, that are necessary for doing cell searches and carrying out cell measurements. The subframes also contain master information block, MIB, and/or system information block 1, SIB1, information which is necessary for system information reading procedures.

SUMMARY

According to some embodiments, a wireless communication device capable of device-to-device, D2D, operation is configured with at least one secondary cell, SCell. The wireless communication device receives a command from a network node to activate or deactivate the SCell. The wireless communication device determines at least its D2D traffic activity level and determines whether to apply or ignore the received command based at least in part on the determined D2D traffic activity level.

In some embodiments, the wireless communication device also determines its wireless access network, WAN, traffic activity level and bases the determination whether or not to apply the received command in part on the WAN traffic activity level. The D2D traffic activity level may comprise a D2D buffer size, a D2D mean bitrate, and/or a D2D average bitrate, and the WAN traffic activity level may comprise a WAN buffer size, a WAN mean bitrate, and/or a WAN average bitrate. In some embodiments, the D2D traffic activity level is detected for the wireless communication device's D2D operation on the SCell. Similarly, in some embodiments, the WAN traffic activity level is detected for the wireless communication device's WAN operation on the SCell.

If the wireless communication device determines to apply the received command, the wireless communication device may optionally introduce a delay prior to applying the received command. As an example, if the received command is a command to deactivate the SCell and the D2D traffic activity level is above a D2D threshold, the wireless communication may delay applying the deactivation command. Similarly, the wireless communication may delay applying the deactivation command if the WAN traffic activity level is above a WAN threshold. If the wireless communication device deactivates the SCell, D2D operation can be moved from the SCell to a different serving cell.

In certain alternative embodiments, the wireless communication device ignores the deactivation command if the D2D traffic activity level is above the D2D threshold and/or if the WAN traffic activity level is above the WAN threshold. If the wireless communication device cannot deactivate the SCell due to D2D activity, the wireless communication device may inform the network node accordingly.

In some embodiments, the wireless communication device receives from the network node a message indicating that the wireless communication device is allowed to autonomously activate or autonomously deactivate the SCell in response to changes in the D2D traffic activity level. Thus, the wireless communication device may autonomously activate or deactivate the SCell in response to changes in the D2D traffic activity level.

In some embodiments, the wireless communication device detects an increase or decrease in its D2D traffic activity level and in response it sends the network node an explicit indication that the network node should activate or deactivate the SCell.

According to some embodiments, a network node may be configured to activate or deactivate an SCell for a wireless communication device capable of D2D operation and configured with at least one SCell. The network node obtains a D2D traffic activity level of the wireless communication device and determines whether to activate or deactivate the SCell based at least in part on the D2D traffic activity level. In some embodiments, the network node optionally obtains the WAN traffic activity level of the wireless communication device and bases the determination whether to activate or deactivate the SCell in part on the WAN traffic activity level. The network node sends an activation or deactivation command to the wireless communication device in response to a determination to activate or deactivate the SCell.

As an example, the network node may send the activation command to the wireless communication device or not send the deactivation command to the wireless communication device if the D2D activity level is above a threshold and/or if the WAN traffic activity level is above a WAN threshold.

In some embodiments, the network node sends the wireless communication device a message indicating whether the wireless communication device is allowed to autonomously activate or autonomously deactivate the SCell in response to changes in the D2D traffic activity level.

In some embodiments, the network node sends the wireless communication device information to enable the wireless communication device to use a different serving cell for D2D operation when the SCell is deactivated.

In some embodiments, the network node receives from the wireless communication device an explicit indication that the network node should activate or deactivate the SCell and activates or deactivates the SCell based on the received indication.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

A problem with existing solutions is that a network node can deactivate or deconfigure an SCell at any time, such as when the wireless communication device has low traffic over the WAN. However, if the wireless communication device is also configured for D2D operation on the SCell, then the behaviour in terms of SCell set up or release procedures is undefined. For example if the SCell on which the wireless communication device is configured for D2D operation is deactivated, then it is unclear and unspecified whether the wireless communication device shall stop performing only WAN operation or both WAN and D2D operations on the deactivated SCell. Therefore, in the existing solutions the D2D operation may not work on the SCell if the SCell setup or release procedure (e.g., deactivation) is applied. Certain embodiments of the present disclosure may provide a solution to this or other problems.

As further described below, in some embodiments, a network node takes D2D activity and D2D subframe patterns into account when performing an SCell setup procedure (e.g., configuration, deconfiguration, activation, or deactivation of an SCell). The network node may further configure the D2D wireless communication devices to be able to autonomously activate and deactivate SCell(s) based at least in part on D2D activity. Optionally, the network node may preconfigure a D2D subframe pattern on multiple PCell(s), PSCell(s), SCell(s), etc. In some embodiments, a D2D wireless communication device ignores activation and deactivation commands from the network node based at least in part on D2D activity in the cell. The wireless communication device may also activate and deactivate SCell(s) autonomously based on several parameters, for example, D2D activity, scheduling D2D subframe pattern, etc. In some embodiments, the wireless communication device sends an explicit indication to the network node indicating whether activation/deactivation of SCell(s) is needed.

Figure 1:
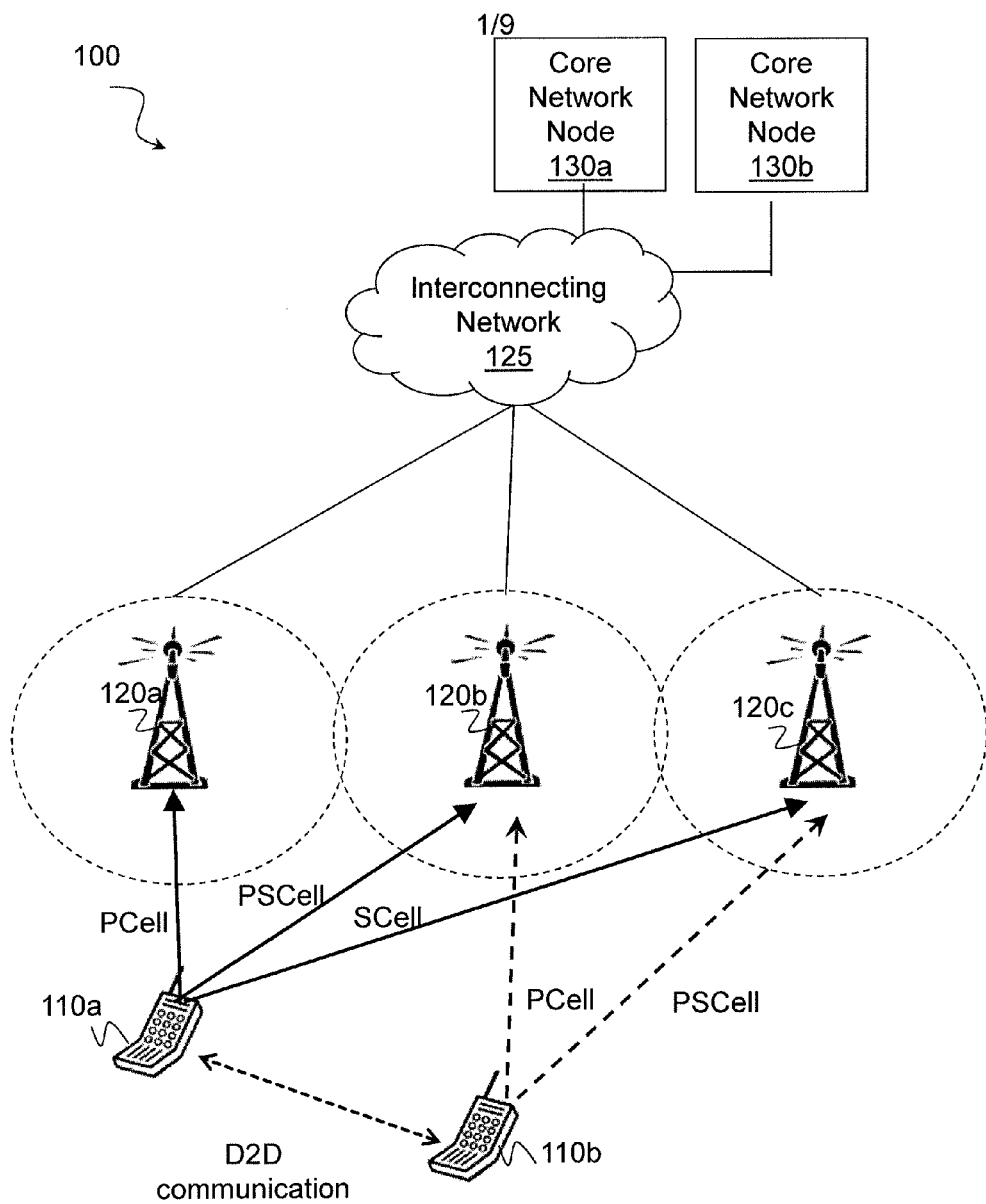
FIG. 1 is a block diagram illustrating an example of a wireless network.

FIG. 1 is a block diagram illustrating an example of a wireless network 100. Wireless network 100 includes one or more wireless communication devices 110 and a plurality of network nodes. The network nodes include radio access nodes 120, such as a base station or eNodeB, and core network nodes 130. In general, a wireless communication device 110 within coverage of a radio access node 120 communicates wireless signals to radio access node 120 and/or receives wireless signals from radio access node 120. The wireless signals contain voice traffic, data traffic, and control signals, for example. Core network node 130 manages the establishment of communication sessions and various other functionality for wireless communication devices 110 within coverage (or partial coverage) of the wireless network. The network nodes connect through interconnecting network 125, which refers to any interconnecting system capable of transmitting audio, video, signals, data, messages, or any combination of the preceding. An example of wireless communication device 110 is described with respect to FIGS. 9A-9B, and an example of a network node is described with respect to FIGS. 10A-10B.

In some embodiments a wireless communication device 110 may be configured with a PCell and a PSCell, or with a PCell, a PSCell, and one or more SCells such as in dual connectivity as illustrated in FIG. 1. In particular, FIG. 1 illustrates an example where a first radio access node 120a serves a first wireless communication device 110a with a PCell. A second radio access node 120b serves the first wireless communication device 110a with a PSCell. The PSCell may be configured for legacy operation. A third radio access node 120c serves the first wireless communication device 110a with an SCell. The SCell is configurable on an as-needed basis.

Although FIG. 1 illustrates the PCell, PSCell, and SCell served by different radio access nodes 120a-120c, in other embodiments the same radio access node 120 could serve any one or more of the PCell, the PSCell, and/or the SCell. As an example, the first radio access node 120a could serve the PCell to the first wireless communication device 110a on one carrier and the first radio access node 120a could also serve the SCell to the first wireless communication device 110a on another carrier.

For purposes of illustration, FIG. 1 shows one SCell configured for the first wireless communication device 110a. However, any suitable number of SCells could be configured for the first wireless communication device 110a on an as-needed basis. Thus, the embodiments presented in this disclosure can apply to a wireless communication device 110 configured with CA with any number of SCells.

The configuration of PCell, PSCell, and SCell may be configured per wireless communication device 110. In the illustrated example, although the second radio access node 120*b* serves the PSCell to the first wireless communication device 110*a*, the second radio access node 120*b* could serve a second wireless communication device 110*b* with a different type of cell, such as a PCell. Similarly, although the third radio access node 120*c* serves the SCell to the first wireless communication device 110*a*, the third radio access node 120*c* could serve the second wireless communication device 110*b* with a different type of cell, such as a PSCell. In the illustrated example, the second wireless communication device 110*b* might not have an SCell configured if the SCell is not needed.

There are typically two types of wireless communication devices 110 in the network. The first type, type 1, being the cellular capable wireless communication device 110 operating cellular traffic. The type 1 wireless communication device 110 may also be referred to as a WAN capable user equipment, UE, or legacy UE. The second type of wireless communication device 110, type 2, is capable of both cellular operation and D2D operation. The type 2 wireless communication device 110 can be configured to operate for only WAN traffic in case D2D operation is not required. FIG. 1 illustrates an example in which the first wireless communication device 110*a* and the second wireless communication device 110*b* can communicate using D2D operation.

The wireless communication devices 110 can be configured to operate on any cells. The embodiments apply when at least one D2D capable (type 2) wireless communication device 110 is available in the network. Such a wireless communication device 110 can be configured with at least one SCell. The PCell, PSCell, and SCell(s) are wireless communication device 110 specific (e.g., the cells can be configured differently for different wireless communication devices 110). However, it is possible that multiple wireless communication devices 110 get configured with the same cell as their PCell or SCell or PSCell. Therefore typically a group of wireless communication devices 110 may have the same PCell, which is different than the PCell of another group of wireless communication devices 110.

The embodiments presented in this disclosure may further be applicable for type 2 wireless communication devices 110 configured with CA with at least a PCell and with any number of SCell(s). Typically the D2D operation may be used on uplink radio resources of the SCell (i.e., on the uplink carrier of the SCell in frequency division duplex, or in uplink subframe(s) of the SCell in time division duplex). However, the embodiments may also be valid if the type 2 wireless communication device 110 is configured for D2D operation on one or more downlink resource (e.g., carriers, subframes, etc.) of the SCell(s) or even when configured for D2D operation on a combination of uplink and downlink SCells. The methods for activation/deactivation and configuration/de-configuration procedures for D2D operation on the SCell are applicable to any number of SCells.

Although the embodiments presented hereinafter are described for the case with CA and SCells, the same principle is applicable for other CA related operations. An example of such operation may be Dual Connectivity. In this case, the D2D wireless communication device 110 may be configured with a PSCell(s), PCell(s), SCell(s) and in which case the same embodiments disclosed hereinafter also apply.

Figure 2:
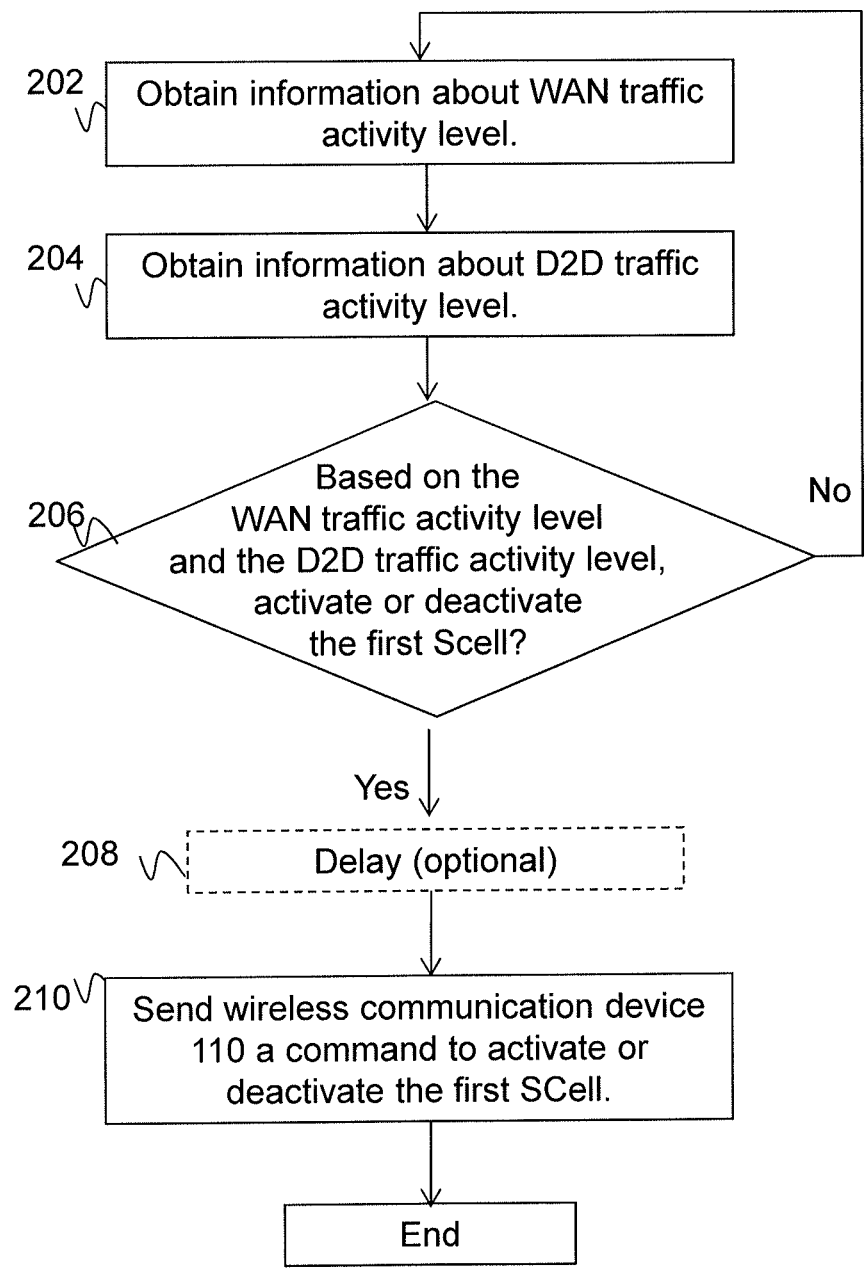
FIG. 2 is a flow diagram illustrating an example of a method in a network node for sending a wireless communication device a command to activate or deactivate an SCell.

FIG. 2 is a flow diagram illustrating an example of a method in a network node for sending a wireless communication device 110 a command to activate or deactivate an SCell. The method can be implemented in a network node serving a wireless communication device 110 configured with at least a first SCell for at least D2D operation. As used herein, the naming convention "first" SCell and "second" SCell is non-limiting. That is, the naming convention is used simply for purposes of explanation as a way of distinguishing different SCells. Any of the first SCell, second SCell, . . . Nth SCell can be configured and/or activated in any suitable order.

At step 202, the method may obtain a first set of information about the wireless communication device 110's WAN (i.e., cellular) traffic activity level. The WAN traffic activity level can be determined in the uplink and/or downlink on one or more serving cells, such as the PCell, the first SCell, if active, and/or one or more other SCell(s), if active. Examples of WAN traffic activity level include WAN buffer size, WAN mean bitrate, WAN average bit rate, and so on.

At step 204, the method may also obtain a second set of information about wireless communication device 110's D2D traffic activity level. The D2D traffic activity level can be determined in the uplink and/or downlink on one or more serving cells, such as the PCell, the first SCell, if active, and/or one or more other SCell(s), if active. Examples of D2D traffic activity level include D2D buffer size, D2D mean bitrate, D2D average bit rate, and so on. The information about D2D activity may be determined by the network node by measuring at the network node, the D2D signals transmitted by the D2D wireless communication device 110 on the uplink carrier frequency. In another example, wireless communication device 110 may explicitly signal D2D activity information to the network node via a communication link between the D2D wireless communication device 110 and the network node.

At step 206, the method determines based on at least the D2D traffic activity level and optionally the WAN traffic activity level whether to activate or deactivate the first SCell. In one example, the network node uses the information on total amount of traffic activity in the PCell to decide whether to activate the first SCell, SCell-1. In this example, the traffic activity level generated by the D2D wireless communication device 110 is compared to an activation threshold. If the amount of traffic activity is greater than the activation threshold, the network node activates SCell-1 and configures the particular wireless communication device 110 to operate D2D on it. On the other hand, if the total amount of traffic activity is below the activation threshold, the network node may choose not to activate SCell-1. In some embodiments, the traffic activity level that the network node compares to the activation threshold may comprise at least wireless communication device 110's D2D traffic activity on at least one serving cell that the wireless communication device 110 is using for D2D traffic, such as the PCell or another SCell (e.g., SCell-2). The traffic activity level that the network node compares to the activation threshold could also comprise the wireless communication device 110's D2D traffic activity on multiple active serving cells and/or wireless communication device 110's WAN traffic activity on one or more active serving cells, such as the PCell and optionally other SCell(s).

In another example, the network node uses the traffic activity level generated by wireless communication device 110 to decide whether to deactivate the first SCell, SCell-1. In this example, the traffic activity level generated by the D2D wireless communication device 110 is compared to a deactivation threshold. If the amount of traffic activity is less than the deactivation threshold, the network node deactivates SCell-1. On the other hand, if the traffic activity level is above the deactivation threshold, the network node may choose not to deactivate SCell-1. In some embodiments, the traffic activity level that the network node compares to the deactivation threshold may comprise at least wireless communication device 110's D2D traffic activity on SCell-1. The traffic activity level that the network node compares to the deactivation threshold could also comprise the wireless communication device 110's D2D traffic activity on one or more other serving cells (such as the PCell and/or other SCell(s)) and/or wireless communication device 110's WAN traffic activity on SCell-1 (and optionally the WAN traffic activity on the PCell and/or other SCell(s)).

Another type of information that the network node may use to determine whether to activate and deactivate the SCell is the number and/or proportion of WAN/D2D subframes during a certain time period (e.g., 500 ms) configured for that wireless communication device 110 on the SCell. In the legacy procedure to deactivate the SCell, the network node may look at the amount of traffic that is generated in that SCell only for WAN operation. If the amount of traffic generated is low, the network node may send the command to wireless communication device 110 to deactivate the SCell. The method presented in this embodiment explicitly takes into account the traffic associated with the D2D operation. If a D2D capable wireless communication device 110 configured for D2D operation on an SCell has ongoing D2D traffic activity, then the network node may choose not to deactivate that particular SCell even if there is no WAN activity. This prevents any disruption in the ongoing D2D operation on the SCell for that wireless communication device 110.

In yet another example the network node may decide to deactivate or deconfigure an SCell provided no WAN traffic activity and no D2D traffic activity are observed by the network node for the last at least certain period of time (T1), for example, over the last 500 ms.

In yet another example, the network node has information regarding the configured D2D subframe pattern on the SCell, and it may activate a newly entered type 2 D2D wireless communication device 110 for operation on that SCell based on this information. The pattern comprises of a first set of subframes that can be used for only D2D operation and a second set of subframes that can be used for only WAN operation. In some examples the pattern may further comprise of a second set of subframes that can be used for both D2D and WAN operations. WAN operation may be prioritized over D2D, in case of conflict between D2D and WAN operations.

In another example the network node may also choose to deactivate the SCell when the configured subframe pattern does not include any D2D subframe.

In yet another example the network node may also choose not to deactivate the SCell when there is at least Y D2D subframes out of a total of Z subframes in a subframe pattern, for example, the SCell is not deactivated if at least Y=10 out of Z=200 subframes are D2D subframes. This is because it is expected that wireless communication device 110 may use D2D subframes for D2D operation, such as D2D communication. D2D communication may be used for any suitable purpose, such as for a warning or emergency situation.

If at step 206 the network node determines not to activate or deactivate the first SCell, the method may return to step 202 to continue monitoring the traffic activity level. If at step 206 the network node determines to activate or deactivate the first SCell, then at step 210 the method sends an activation or deactivation command to wireless communication device 110. In some embodiments, the activation or deactivation command may be sent after a certain delay (as shown at step 208).

The meaning of SCell setup or release command that is based on or that takes into account the D2D traffic activity level may also be pre-defined. For example, it may be pre-defined that a D2D capable wireless communication device 110 configured with D2D operation on an SCell, upon receiving SCell setup or release command from the network node (e.g., SCell activation/de-activation command), shall apply the received command regardless of whether the D2D subframes are configured on SCell and/or regardless of whether there is any D2D traffic related activity on that SCell. Based on such behaviour of wireless communication device 110, the wireless communication device 110 will deactivate the SCell.

In yet another example, it may be pre-defined that a D2D capable wireless communication device 110 configured with D2D operation on an SCell, upon receiving SCell setup or release command from the network node (e.g., SCell activation/de-activation command), may deactivate the SCell regardless of whether the D2D subframes are configured on SCell and/or regardless of whether there is any D2D traffic related activity on that SCell or after performing or after completing the ongoing D2D operation. That is, if there is D2D traffic activity on that SCell, whether or not wireless communication device 110 deactivates the SCell is up to the wireless communication device 110's implementation.

Figure 3:
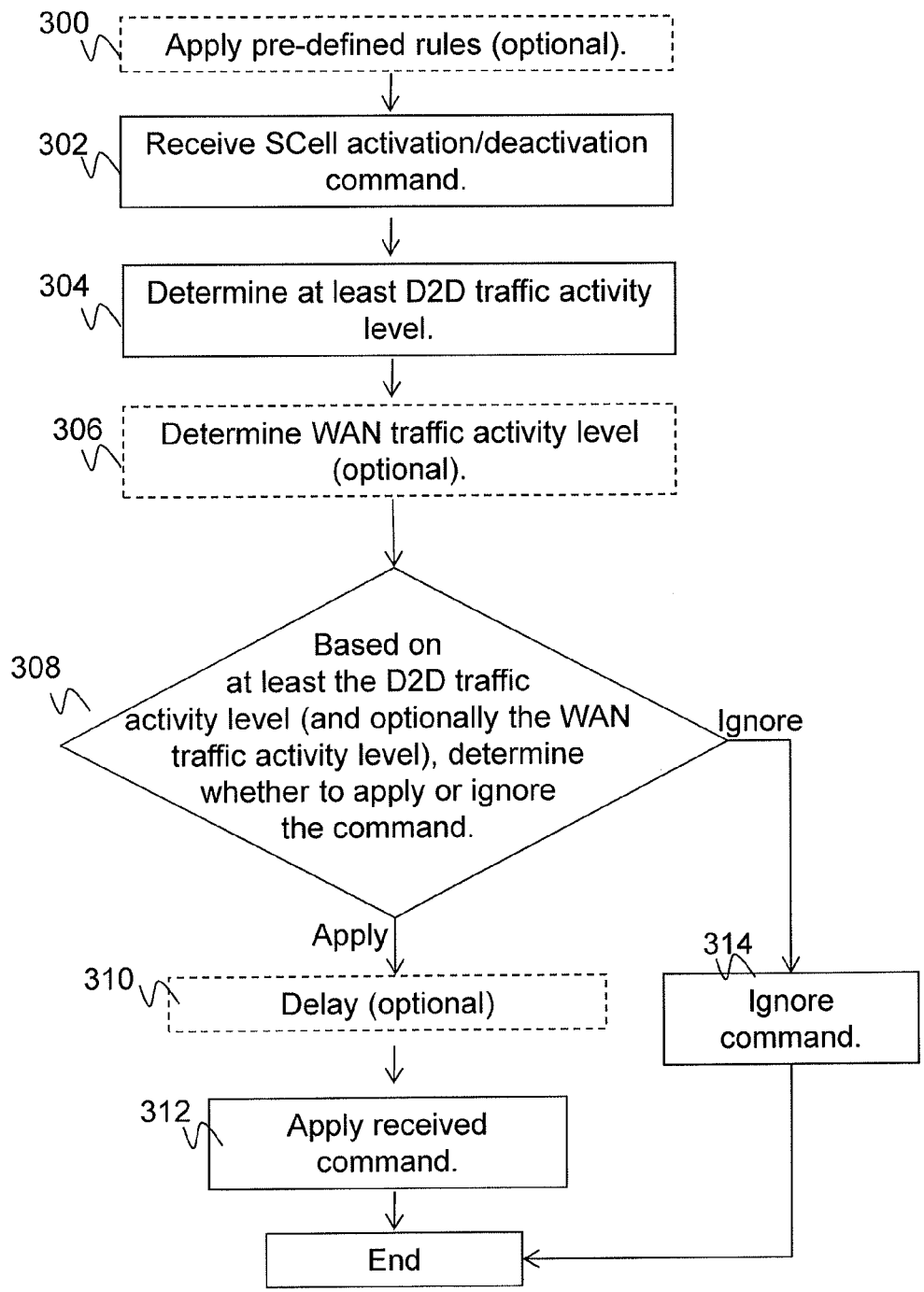
FIG. 3 is a flow diagram illustrating an example of a method in a wireless communication device for determining whether to activate or deactivate an SCell based at least in part on a D2D activity level.

FIG. 3 is a flow diagram illustrating an example of a method in a wireless communication device 110 for determining whether to activate or deactivate an SCell based at least in part on a D2D activity level. The wireless communication device 110 is capable of device-to-device, D2D, operation and configured with at least one secondary cell, SCell.

At step 300, wireless communication device 110 may optionally apply pre-defined rules. As an example, the pre-defined rules may allow wireless communication device 110 to autonomously activate and/or autonomously deactivate an SCell. Autonomous operation may refer to operation where wireless communication device 110 decides on its own whether it needs to activate or deactivate an SCell and/or operation where the wireless communication device 110 decides if and when to apply an activation or deactivation command from the network node. That is, the pre-defined rules may allow a D2D capable wireless communication device 110 to ignore, delay, or follow a network node's command to activate or deactivate an SCell on which D2D operation is configured. In some embodiments, the pre-defined rules may provide D2D subframes or a pattern for configuring D2D operation on an SCell. The pre-defined rules may be stored on wireless communication device 110 in advance or received from the network node.

At step 302, wireless communication device 110 receives a command from a network node, such as radio access node 120, to activate or deactivate an SCell, such as SCell-1. The received command may optionally include other information. For example, if the received command is to deactivate SCell-1, the received command may include a set of D2D subframes or a pattern on a different serving cell (e.g., PCell and/or a second SCell, SCell-2) for enabling the wireless communication device 110 to use the different serving cell for D2D operation while SCell-1 is deactivated.

At step 304, wireless communication device 110 determines at least its D2D traffic activity level. If SCell-1 is active, wireless communication device 110 may determine the D2D traffic activity level on at least SCell-1 and optionally on PCell and/or any other active SCell(s) (e.g., SCell-2). If SCell-1 is not active, wireless communication device 110 may determine the D2D traffic activity level on one or more other serving cells, such as PCell and/or any other active SCell(s) (e.g., SCell-2). Examples of D2D traffic activity level include D2D buffer size, D2D mean bitrate, and D2D average bitrate.

At step 306, wireless communication device 110 optionally determines its WAN traffic activity level. If SCell-1 is active, wireless communication device 110 may determine the WAN traffic activity level on at least SCell-1 and optionally on PCell and/or any other active SCell(s) (e.g., SCell-2). If SCell-1 is not active, wireless communication device 110 may determine the WAN traffic activity level on one or more other serving cells, such as PCell and/or any other active SCell(s) (e.g., SCell-2). Examples of WAN traffic activity level include WAN buffer size, WAN mean bitrate, and WAN average bitrate.

At step 308, wireless communication device 110 determines whether to apply or ignore the received command based at least in part on the D2D traffic activity level determined at step 304 and optionally based in part on the WAN traffic activity level determined at step 306. As an example, if the received command is a deactivation command, wireless communication device 110 may ignore the deactivation command or delay applying the deactivation command if the D2D traffic activity level is above a D2D threshold, if the WAN traffic activity level is above a WAN threshold, and/or if the combined D2D and WAN traffic activity level is above a combined D2D/WAN threshold.

Similarly, if the received command is an activation command, wireless communication device 110 may ignore the activation command or delay applying the activation command if the D2D traffic activity level is below a D2D threshold, if the WAN traffic activity level is below a WAN threshold, and/or if the combined D2D and WAN traffic activity level is below a combined D2D/WAN threshold. The D2D threshold, WAN threshold, and/or combined D2D/WAN threshold used to determine whether to apply the activation command can be the same as or different than the D2D threshold, WAN threshold, and/or combined D2D/WAN threshold used to determine whether to apply the deactivation command.

In some embodiments, the determination made by wireless communication device 110 at step 308 of FIG. 3 may be generally analogous to one or more of the examples described with respect to step 206 of FIG. 2.

If at step 308 wireless communication device 110 determines to ignore the command, the method proceeds to step 314 where the command is ignored. Wireless communication device 110 may optionally send a message to the network node indicating that it is ignoring the received command. As an example, if wireless communication device 110 ignores a deactivation command due to ongoing D2D traffic activity, wireless communication device 110 may send the network node a message that it cannot deactivate the SCell due to the D2D activity.

If at step 308 wireless communication device 110 determines to apply the command, the method proceeds to step 310 where a delay may optionally be introduced prior to applying the received command and then to step 312 to apply the received command. The delay at step 310 may be based at least in part on the D2D traffic activity level. As an example, wireless communication device 110 may delay applying a command to deactivate SCell-1 until its D2D traffic activity level (and optionally its WAN traffic activity level) on SCell-1 falls below the applicable threshold. Thus, the delay of step 310 may be distinct from the n+8 subframe deactivation delay of TS 36.133 release 10 described above in the background section.

At step 312, wireless communication device 110 applies the received command. Thus, if the received command is to activate SCell-1, wireless communication device 110 activates SCell-1. If the received command is to deactivate SCell-1, wireless communication device 110 deactivates SCell-1. In response to deactivating SCell-1, wireless communication device 110 optionally moves D2D operation to a different serving cell, such as the PCell or another SCell (e.g., SCell-2, if active). To configure D2D communication on the different serving cell, wireless communication device 110 may use D2D subframes or a pattern based on the pre-defined rules of step 300 or based on information from the network node (which may be sent with the command received in step 302).

An example embodiment of the method of FIG. 3 allows wireless communication device 110 to choose to either follow the received SCell activation/deactivation command or ignore it depending on at least D2D activity level. Whether or not to apply the SCell activation/deactivation command received from the network node is determined by wireless communication device 110 based on one or more pre-defined rules or principles. This method enables the configured D2D wireless communication devices 110 to activate and deactivate the SCell on an as needed basis. For example, the configured wireless communication device 110 may choose to activate SCell when there is D2D traffic and it may choose to deactivate the already activated SCell if there is no D2D traffic. Examples of rules that may be applied by wireless communication device 110 (e.g., the pre-defined rules of step 300) are as follows:

In a first example of a pre-defined rule, wireless communication device 110 is allowed to ignore SCell deactivation command and is therefore permitted not to deactivate SCell in case there is D2D traffic activity on that SCell.

In a second example of a pre-defined rule, wireless communication device 110 is allowed to delay the deactivation of the SCell in case there is D2D traffic activity on that SCell. Wireless communication device 110 is allowed to delay until there is no D2D traffic activity on that SCell or no D2D traffic activity for at least time period, T2.

In a third example of a pre-defined rule, a D2D capable wireless communication device 110 which is configured on one or more serving cells (e.g., PCell) for WAN and/or D2D operation receives a command to activate another SCell (e.g., SCell-1) for D2D operation. In this case, wireless communication device 110 may follow the command and activate SCell-1 for D2D operation. That is, wireless communication device 110 may or may not use this SCell-1 for WAN operation.

In a fourth example of a pre-defined rule, a D2D capable wireless communication device 110 which is already configured for D2D operation and operates D2D on SCell-1 receives a command to deactivate SCell-1. In this case, wireless communication device 110 may choose to ignore the command and continue its D2D operation on SCell-1. The advantage of this method is that the D2D operation is protected from any interruption compared to the case with the legacy deactivation procedure which would cause interruption up to certain time period, e.g., 5 ms.

In a fifth example of a pre-defined rule, the activation and deactivation can also be based on subframe configurations in the said SCell. This is exemplified as follows. A D2D capable wireless communication device 110 is configured to operate D2D on SCell-1. In this case, the D2D wireless communication device 110 has information regarding the subframe configuration in that cell which can be signalled to wireless communication device 110 from a network node, such as the serving node. The D2D wireless communication device 110 may study the pattern of the subframe configuration and use this pattern to, find out how many D2D subframes are to be scheduled in the next T seconds, for example. The subframe configuration may for example consist of N total subframes which may also include non-D2D subframe. If at least M subframes out of N total subframes are D2D subframes, the D2D wireless communication device 110 may choose to keep the configured SCell and thereby ignore the deactivation command from the network node. In this example parameters M and/or N may be configurable or pre-defined.

In a sixth example, wireless communication device 110 configured for both WAN and D2D operation on an SCell, upon receiving a deactivation command for that SCell, is allowed to ignore or delay the deactivation of that SCell until there is activity for at least any one of WAN traffic and D2D traffic.

In a seventh example, wireless communication device 110 configured for both WAN and D2D operation on an SCell, upon receiving a deactivation command for that SCell, may deactivate SCell but is allowed to activate the SCell during the subframes configured for D2D operations. It may further be pre-defined that wireless communication device 110 in this case (i.e., activate the SCell during D2D subframes) shall not cause any interruption of UL and DL signals on PCell and/or on activated SCell. It may also be further pre-defined that wireless communication device 110 in this case (i.e., activate the SCell during D2D subframes) shall not cause interruption of UL and DL signals on PCell and/or on activated SCell, more than a certain threshold, e.g., not more than a probability of 0.5% in terms of missed ACK/NACK under continuous data allocation.

In an eighth example, it may be pre-defined that wireless communication device 110 configured with D2D operation on an SCell upon receiving an SCell setup or release command from the network node shall perform the setup or release of that SCell during a first pre-defined setup or release delay requirements regardless of whether or not wireless communication device 110 is configured with D2D subframes for D2D operation on that SCell. The first pre-defined setup or release delay requirements are the existing (i.e., legacy) requirements, which wireless communication device 110 meets for performing the SCell setup or release procedures when wireless communication device 110 is not configured with D2D operation on that SCell. For example SCell activation delay requirements of 24 ms or 34 ms and deactivation delay requirements of 8 ms (as described in the background section above) are examples of first SCell setup and release pre-defined requirements.

To achieve this objective (i.e., the pre-defined rule to ensure first pre-defined requirement is met), wireless communication device 110 will have to selectively ignore D2D operation in some of the D2D subframes while performing the SCell setup or release procedure. This is because during the SCell setup or release procedure, wireless communication device 110 has to measure on certain WAN signals on DL cell and thereby cannot afford to interrupt WAN reception in certain DL subframes that carry certain signals used for SCell setup or release procedure (e.g., PSS/SSS, CRS, etc.). Otherwise these procedures will be extended. The WAN subframes can be interrupted due to switching between D2D and WAN subframes.

In a ninth example, any of the above rules or combinations of rules may be configured for all D2D operation or, in the alternative, for only a particular type (or types) of D2D operation. Examples of types of D2D operations are D2D discovery, D2D communication, a particular type of D2D discovery, a particular type of D2D application (e.g., emergency system or warning system), etc.

Figure 4:
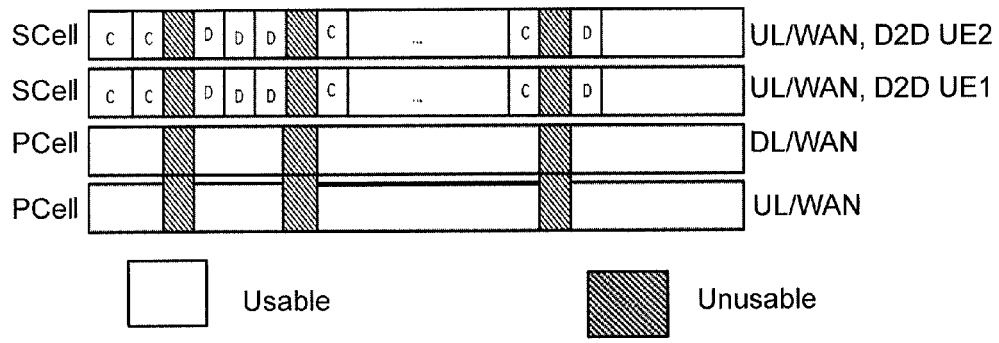
FIGS. 4-5 are block diagrams illustrating examples of interruptions in PCell and D2D operation during SCell addition, activation, deactivation, and release.
Figure 5:
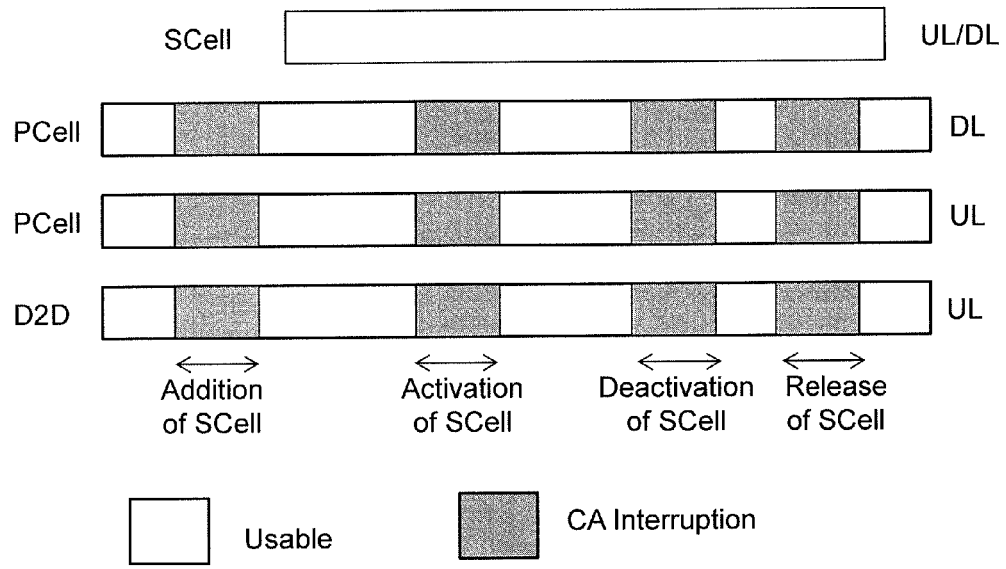

FIGS. 4-5 are block diagrams illustrating examples of interruptions in PCell and D2D operation during SCell addition, activation, deactivation, and release. The addition/release and activation/de-activation of SCells causes interruption in the uplink, UL, and downlink, DL, on reception and transmission of signals on their respective PCells. If the wireless communication device 110 is configured with two or more SCells, then there is also interruption on any activated SCell if any other SCell is activated/deactivated or even configured/deconfigured. The length of interruption depends on the type of CA configuration for which the SCell is being configured (e.g., 5 ms for intra-band SCell, or 1 ms for inter-band CA).

When the SCell is first configured, it may by default be deactivated. After SCells have been added, the network node may activate and deactivate them based on, for example, their respective traffic activities in UL and/or DL. In existing solutions this is determined based on the traffic activity level of only WAN traffic. In one exemplary embodiment the network node may use information on both the WAN traffic activity level and the D2D traffic activity level in order to determine whether to activate or deactivate the SCell(s).

Figure 6:
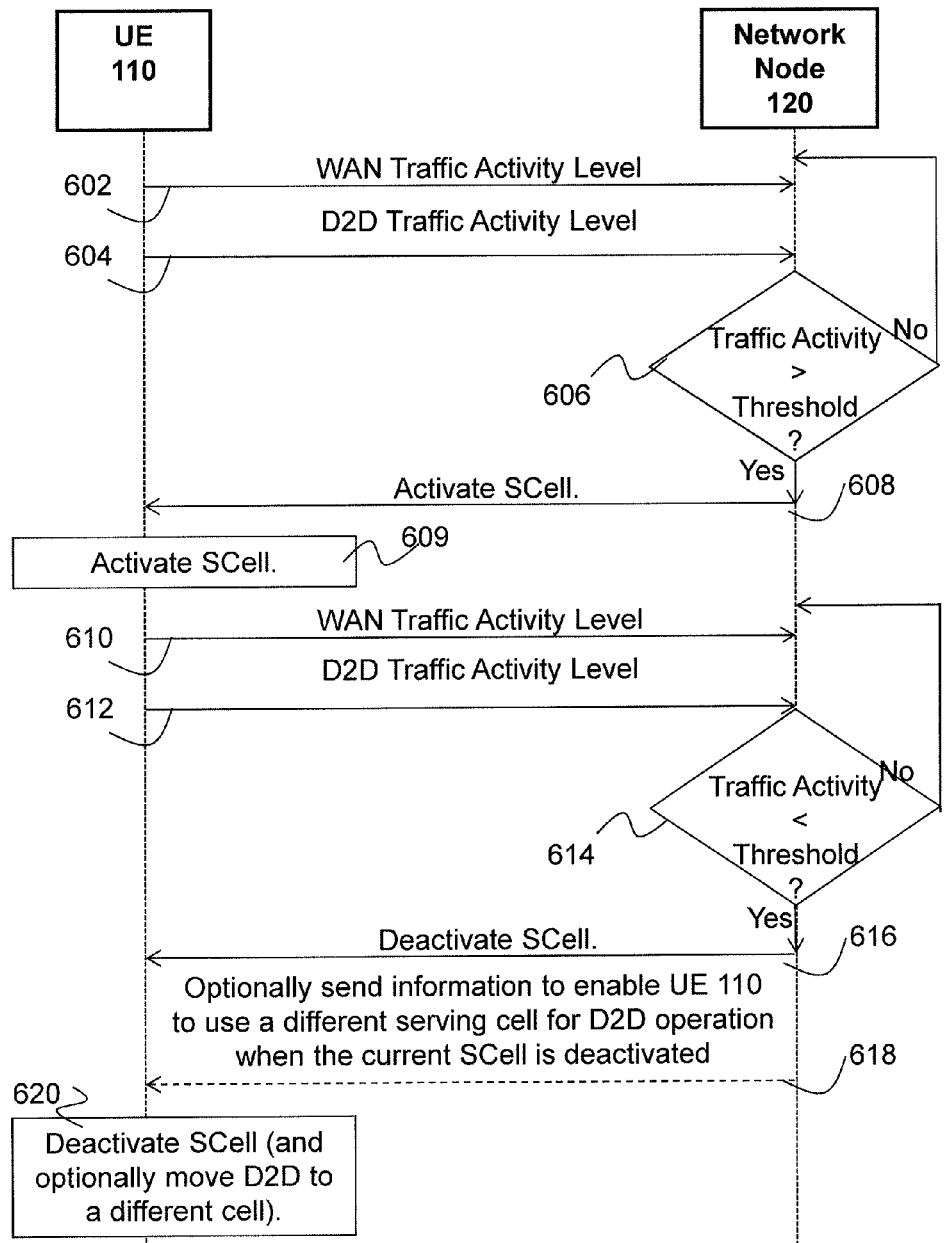
FIG. 6 is a signalling diagram illustrating an example of activating and deactivating an SCell.

FIG. 6 is a signalling diagram illustrating an example of activating and deactivating an SCell for a wireless communication device 110 capable of D2D operation and configured with at least one SCell. The method may begin with the SCell deactivated.

At step 602, radio access node 120 obtains a WAN traffic activity level of the wireless communication device 110. The WAN traffic activity level can be determined in the uplink and/or downlink on one or more serving cells, such as the PCell and/or one or more SCell(s) being used by wireless communication device 110. Examples of WAN traffic activity level include WAN buffer size, WAN mean bitrate, WAN average bit rate, and so on. The information about WAN activity may be obtained by radio access node 120 by measuring at radio access node 120, the WAN signals transmitted by wireless communication device 110 on the uplink carrier frequency and/or the WAN signals transmitted by radio access node 120 on the downlink carrier frequency. In another example, wireless communication device 110 may explicitly signal WAN activity information to radio access node 120 via a communication link between wireless communication device 110 and radio access node 120.

At step 604, radio access node 120 obtains a D2D traffic activity level of the wireless communication device 110. The D2D traffic activity level can be obtained in the uplink and/or downlink on one or more serving cells, such as the PCell and/or one or more SCell(s) being used by wireless communication device 110. Examples of D2D traffic activity level include D2D buffer size, D2D mean bitrate, D2D average bit rate, and so on. The information about D2D activity may be determined by radio access node 120 by measuring at radio access node 120, the D2D signals transmitted by the D2D wireless communication device 110 on the uplink carrier frequency and/or downlink carrier frequency. In another example, wireless communication device 110 may explicitly signal D2D activity information to radio access node 120 via a communication link between the D2D wireless communication device 110 and radio access node 120.

At step 606, radio access node 120 determines whether to activate the SCell based at least in part on the D2D traffic activity level obtained in step 604. For example, if the D2D traffic activity level is above a D2D threshold, radio access node 120 may determine to activate the SCell. The determination may also be based in part on the WAN traffic activity level. For example, if the WAN traffic activity level is above a WAN threshold (or if the combined D2D and WAN traffic activity level is above a combined D2D/WAN threshold), radio access node 120 may determine to activate the SCell. In some embodiments, radio access node 120 may determine whether to activate the SCell according to one or more of the examples described above with respect to step 206 of FIG. 2.

If at step 606 radio access node 120 determines not to activate the SCell, the method returns to step 602 so that the traffic activity level can continue to be monitored. If at step 606 radio access node 120 determines to activate the SCell, the method proceeds to step 608 where radio access node sends an activation command to the wireless communication device 110. At step 609, wireless communication device 110 activates the SCell.

At step 610, radio access node 120 obtains a WAN traffic activity level of the wireless communication device 110. The WAN traffic activity level can be determined in the uplink and/or downlink on at least the SCell that radio access node 120 is considering deactivating and optionally on one or more other serving cells, such as the PCell and/or one or more other SCell(s) being used by wireless communication device 110, if any.

At step 612, radio access node 120 obtains a D2D traffic activity level of the wireless communication device 110. The D2D traffic activity level can be determined in the uplink and/or downlink on at least the SCell that radio access node 120 is considering deactivating and optionally on one or more other serving cells, such as the PCell and/or one or more other SCell(s) being used by wireless communication device 110, if any.

At step 614, radio access node 120 determines whether to deactivate the SCell based at least in part on the D2D traffic activity level obtained in step 612. For example, if the D2D traffic activity level is above a D2D threshold, radio access node 120 may determine not to deactivate the SCell. The determination may also be based in part on the WAN traffic activity level. For example, if the WAN traffic activity level is above a WAN threshold (or if the combined D2D and WAN traffic activity level is above a combined D2D/WAN threshold), radio access node 120 may determine not to deactivate the SCell. If the D2D traffic activity level and the WAN traffic activity level for the SCell are below their respective thresholds (or below a combined D2D/WAN threshold), radio access node 120 may determine to deactivate the SCell.

If at step 614 radio access node 120 determines not to deactivate the SCell, the method returns to step 610 so that the traffic activity level can continue to be monitored. If at step 614 radio access node 120 determines to deactivate the SCell, the method proceeds to step 616 where radio access node sends a deactivation command to the wireless communication device 110.

At step 618, radio access node 120 optionally sends information to enable wireless communication device 110 to use a different serving cell for D2D operation when the current SCell is deactivated. For example, radio access node 120 sends a set of D2D subframes or a pattern on the different serving cell (e.g., a PCell and/or a second SCell) for enabling the wireless communication device 110 to use the different serving cell for D2D operation while the first SCell is deactivated.

At step 620, wireless communication device 110 deactivates the SCell. In certain other embodiments, wireless communication device 110 may delay or ignore applying the deactivation command (e.g., as described with respect to FIG. 3 above).

In response to deactivating the SCell, wireless communication device 110 optionally moves D2D operation to a different serving cell, such as the PCell or another SCell if such other SCell is active. For example, wireless communication device 110 may use the D2D subframes or pattern configured in step 618 for sending D2D communication on the different serving cell.

In some embodiments, radio access node 120 may pre-configure wireless communication device 110 with D2D subframes/pattern for D2D operation on multiple serving cells of the D2D capable wireless communication device 110, such as on PCell and one or more SCells or on two or more SCells, say SCell-1 and SCell-2. Wireless communication device 110 may also be configured to perform D2D operation on one serving cell at a time. Such a serving cell may be termed as principle D2D operating cell.

Assume that SCell-2 is designated as the principle D2D operating cell. If SCell-2 is deactivated at later point in time, the D2D wireless communication device 110 in that cell may switch its D2D operation to be on either PCell or any other activated SCell (e.g., SCell-1) during the time that the SCell-2 remains deactivated. If the SCell-2 is activated again, then wireless communication device 110 resumes the D2D operation on the principle D2D operating cell (e.g., SCell-2).

Figure 7:
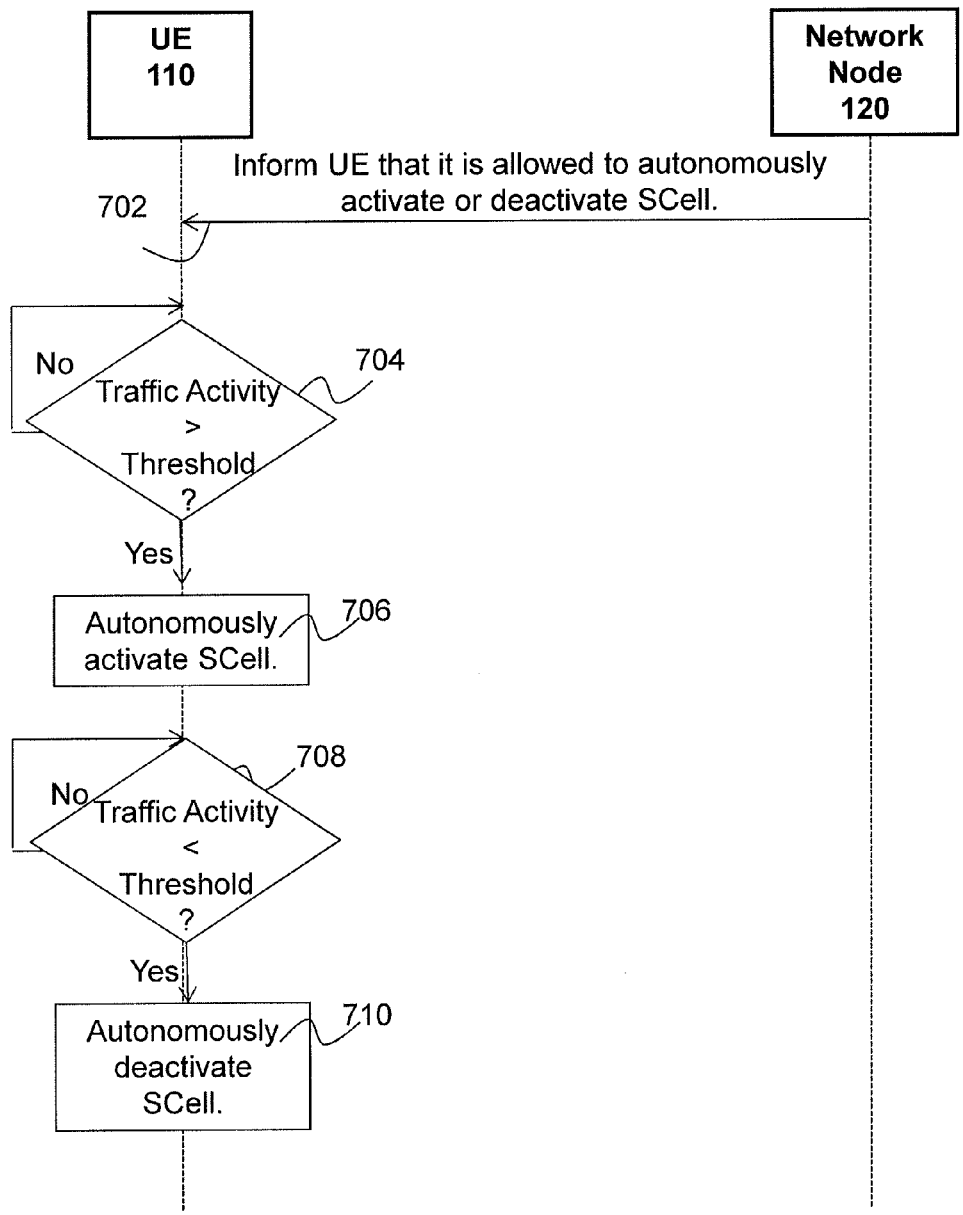
FIG. 7 is a signalling diagram illustrating an example of activating and deactivating an SCell autonomously by a wireless communication device.

FIG. 7 is a signalling diagram illustrating an example of activating and deactivating an SCell autonomously by a wireless communication device 110. The method may begin with the SCell deactivated. At step 702, wireless communication device 110 receives from radio access node 120 a message indicating that wireless communication device 110 is allowed to autonomously activate and/or autonomously deactivate the SCell in response to changes in the D2D traffic activity level. In alternative embodiments, wireless communication device 110 may be preconfigured to support autonomous activation/deactivation of an SCell.

At step 704, wireless communication device 110 determines whether the traffic activity level exceeds an activation threshold. The traffic activity level comprises at least D2D traffic activity and optionally WAN traffic activity. In some embodiments, the determination performed by wireless communication device 110 at step 704 of FIG. 7 may be analogous to the determination performed by radio access node 120 in the embodiment described with respect to step 606 of FIG. 6.

If the traffic activity level is less than the activation threshold, wireless communication device 110 may continue monitoring the D2D traffic activity and WAN traffic activity until the activation threshold has been exceeded. Once the traffic activity level is greater than the activation threshold, the wireless communication device 110 autonomously activates the SCell. Wireless communication device 110 configured for autonomous operation need not send any message to radio access node 120 to allow the activation of the SCell.

At step 708, wireless communication device 110 monitors traffic activity. For example, wireless communication device 110 may monitor at least the D2D traffic activity level on the SCell. Wireless communication device 110 may optionally monitor the D2D traffic activity level on other serving cells and/or the WAN traffic activity level on the SCell and/or other serving cells, such as the PCell or one or more other SCells. Wireless communication device 110 compares the traffic activity level to a deactivation threshold, which may be the same as the activation threshold or different than the activation threshold. The thresholds may be set to any suitable value. If traffic activity level is above the deactivation threshold, wireless communication device 110 continues monitoring the traffic activity level. If traffic activity level falls below the deactivation threshold, wireless communication device 110 proceeds to step 710 to autonomously deactivate the SCell. Wireless communication device 110 configured for autonomous operation need not send any message to radio access node 120 to allow the deactivation of the SCell. Thus, wireless communication device 110 can decide to wait to deactivate the SCell until it determines that there is low or no D2D traffic on the SCell being deactivated.

In one example embodiment, there is only PCell, and no SCell is configured. Once a D2D capable wireless communication device 110 enters the network and its D2D activity has reached a certain level, the wireless communication device 110 may autonomously activate an SCell (e.g., SCell-1) and operate D2D on it provided the wireless communication device 110 has been configured to do so by radio access node 120. Likewise, when wireless communication device 110 is no longer in D2D operation up to a certain level it may deactivate SCell-1 provided it has been configured to do so by radio access node 120. The wireless communication device 110 may activate and deactivate the SCell(s) based on its D2D activity and, in some embodiments, also based on whether or not another type 2 D2D capable wireless communication device 110 has entered the cell (e.g., PCell).

In yet another example the wireless communication device 110 may be explicitly permitted by radio access node 120 to deactivate an SCell provided there is no D2D activity (e.g., no D2D traffic in buffer and/or no D2D signal transmission/reception over the time period, T3) and there is also no WAN traffic activity on that SCell (e.g., no WAN traffic in buffer and/or no WAN signal transmission/reception over the time period, T4). Otherwise the wireless communication device 110 may be required to keep the SCell activated. The wireless communication device 110 may also be configured with one or more parameters. Examples of such parameters are time periods over which the traffic activity level is to be observed, type of performance measure or metric for determining traffic activity level such as buffer size, average bit rate, etc. The parameters may be preconfigured or may be sent to wireless communication device 110 from radio access node 120 (e.g., the parameters could be included in the message 702 that informs wireless communication device 110 that it is allowed to act autonomously).

Figure 8:
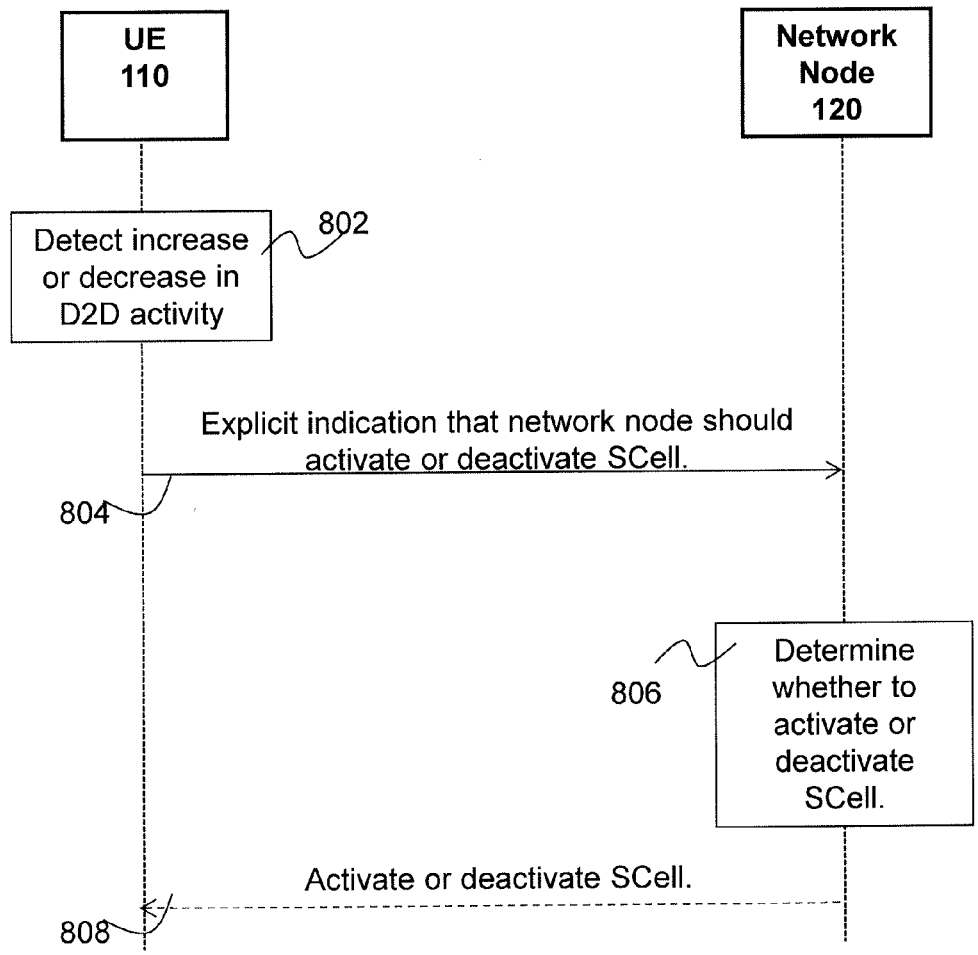
FIG. 8 is a signalling diagram illustrating an example of a wireless communication device signalling a network node to activate or deactivate an SCell.

FIG. 8 is a signalling diagram illustrating an example of a wireless communication device 110 signalling a radio access node 120 to activate or deactivate an SCell. As an example, at step 802, wireless communication device 110 detects an increase in the D2D traffic activity level and at step 804 wireless communication device 110 sends radio access node 120 an explicit indication (e.g., via PCell or any activated SCell) that radio access node 120 should activate the SCell. Radio access node 120 receives the explicit indication and at step 806 determines whether to activate the SCell. For example, radio access node 120 may determine whether to activate the SCell based on resource availability or performance characteristics in the network. If radio access node 120 determines to activate the SCell, it may send an activation command to wireless communication device 110 at step 808.

As another example, at step 802, wireless communication device 110 detects a decrease in the D2D traffic activity level (or no D2D activity) and at step 804 wireless communication device 110 sends radio access node 120 an explicit indication (e.g., via PCell or any activated SCell) that radio access node 120 should deactivate the SCell. Radio access node 120 receives the explicit indication and at step 806 determines whether to deactivate the SCell. For example, radio access node 120 may determine whether to deactivate the SCell based on resource availability or performance characteristics in the network. If radio access node 120 determines to deactivate the SCell, it may send a deactivation command to wireless communication device 110 at step 808.

In certain embodiments, wireless communication device 110 may also signal information about both WAN and D2D activity level to radio access node 120 (e.g., in step 804). The following is one example of a signal flow in which the wireless communication device 110 sends an explicit indication to the network node. In response to the reception of such request or information about at least D2D activity level from wireless communication device 110, radio access node 120 may decide whether or not to activate or deactivate the SCell. For example, if the D2D activity is above a threshold and wireless communication device 110 requests radio access node 120 to activate the SCell, then the network node may activate the SCell. In yet another example, if there is any level of D2D activity and wireless communication device 110 sends request 804 to radio access node 120 to activate the SCell, then radio access node 120 may activate the SCell even if D2D activity level is low. In yet another example, if there is no D2D activity or D2D activity is below a threshold and wireless communication device 110 sends request 804 to radio access node to deactivate the SCell, then radio access node 120 may deactivate the SCell.

Figure 9A:
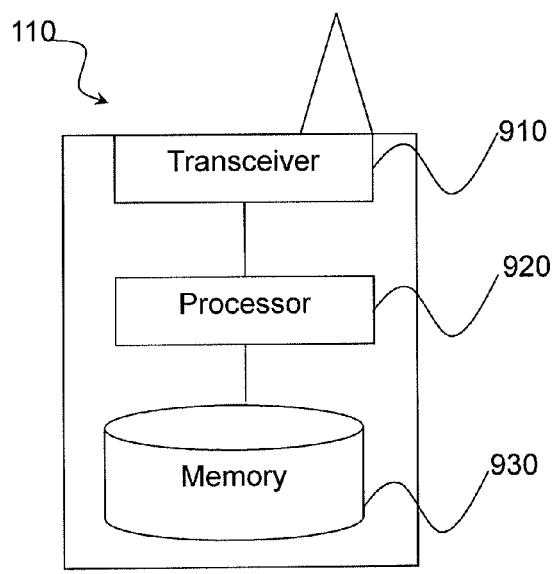
FIG. 9A is a block diagram illustrating an example of a wireless communication device.

FIG. 9A is a block diagram illustrating an example of a wireless communication device 110. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 includes transceiver 910, processor 920, and memory 930. In some embodiments, transceiver 910 facilitates transmitting wireless signals to and receiving wireless signals from radio access node 120 (e.g., via an antenna), processor 920 executes instructions to provide some or all of the functionality described herein as provided by a wireless communication device 110 and/or some or all of the functionality described herein as provided by a UE (which may be referred to interchangeably as wireless communication device 110), and memory 930 stores the instructions executed by processor 920.

Processor 920 includes any suitable combination of hardware and software implemented in one or more integrated circuits or modules to execute instructions and manipulate data to perform some or all of the described functions of wireless communication device 110. Memory 930 is generally operable to store computer executable code and data. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 9A) responsible for providing certain aspects of the wireless device's functionality, including any of the functionality described above and/or any additional functionality (including any functionality necessary to support the solution described above). Particular embodiments presented in this disclosure may be applicable to single carrier as well as to multicarrier or to carrier aggregation of wireless communication device 110.

Figure 9B:
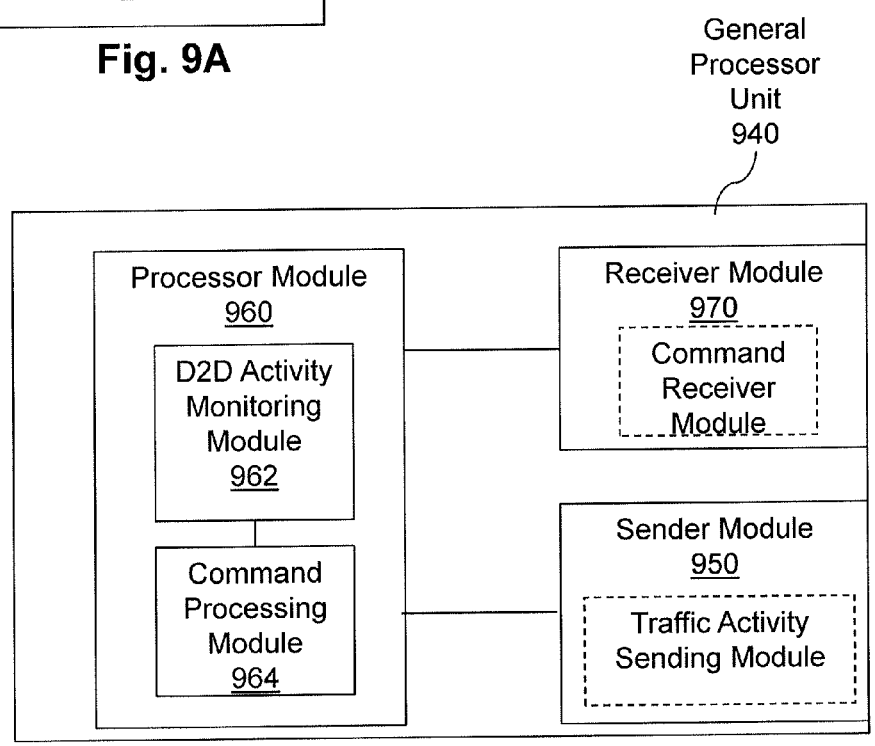
FIG. 9B is a block diagram illustrating example components of a wireless communication device.

FIG. 9B is a block diagram illustrating example components of a wireless communication device 110. In some embodiments, components may include a general processor unit 940 that comprises one or more of a sender module 950, a processor module 960, and/or a receiver module 970. The sender module 950 may optionally include a traffic activity sending sub-module that facilitates sending traffic activity information (such as a D2D traffic activity level and/or WAN traffic activity level) to a network node. The network node may use the traffic activity level to determine whether to send a command to activate or deactivate an SCell. The general processor unit 940 of wireless communication device 110 may receive the command to activate or deactivate the SCell at a command receiver sub-module of the receiver module 970. The receiver module 970 may communicate the command to the processor module 960. The processor module 960 may determine whether to follow the command, to delay following the command/temporarily ignore the command, or to ignore the command based on D2D traffic activity level information received from a D2D activity monitoring sub-module 962 of the processor module 960. As an example, in some embodiments, a command processing module 964 of the processor module 960 may ignore a command to deactivate the SCell at least while wireless communication device 110 is using the SCell for D2D operation. In some embodiments, the modules of general processor 940 may be implemented in one or more processors 920 of FIG. 9A.

Figure 10A:
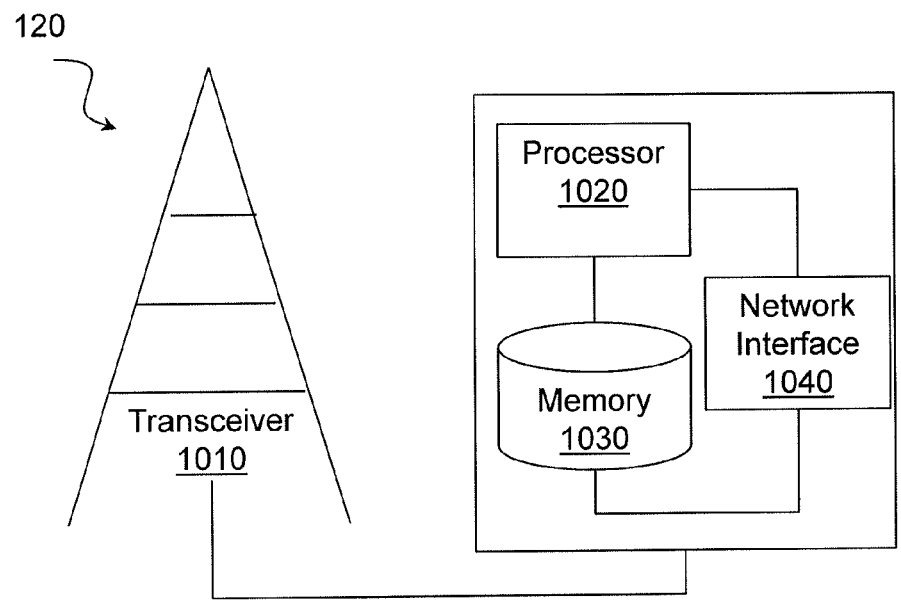
FIG. 10A is a block diagram illustrating an example of a network node.

FIG. 10A is a block diagram illustrating an example of a network node. Examples of a network node include a radio access node 120, such as an eNodeB, a node B, a base station, a wireless access point (e.g., a Wi-Fi access point), a low power node, a base transceiver station (BTS), a transmission point or node, or a remote RF unit (RRU). Examples of other network nodes include, but are not limited to, a mobile switching center (MSC), a serving GPRS support node (SGSN), a mobility management entity (MME), a radio network controller (RNC), a base station controller (BSC), or any suitable core network node 130.

The network node includes at least one processor 1020, at least one memory 1030, and at least one network interface 1040. In certain embodiments, such as embodiments in which the network node is a radio access node 120, the network node can also include a transceiver 1010. Transceiver 1010 facilitates transmitting wireless signals to and receiving wireless signals from wireless communication device 110 (e.g., via an antenna); processor 1020 executes instructions to provide some or all of the functionality described above as being provided by a network node; memory 1030 stores the instructions executed by processor 1020; and network interface 1040 communicates signals to backend network components, such as a gateway, switch, router, Internet, Public Switched Telephone Network (PSTN), and/or other network nodes (e.g., radio access nodes 120 or core network nodes 130). The processor 1020 and memory 1030 can be of the same types as described supra with respect to FIG. 9A.

In some embodiments, network interface 1040 is communicatively coupled to processor 1020 and refers to any suitable device operable to receive input for the network node, send output from the network node, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

Other embodiments of the network node include additional components (beyond those shown in FIG. 10A) responsible for providing certain aspects of the node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 10B:
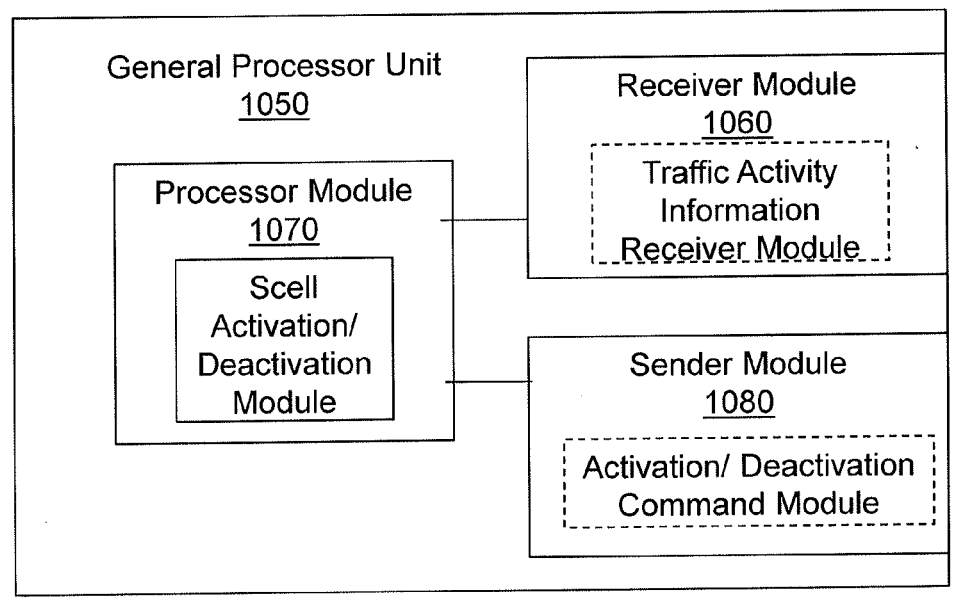
FIG. 10B is a block diagram illustrating an example of components of a network node.

FIG. 10B is a block diagram illustrating an example of components of a network node. In some embodiments, components may include a general processor unit 1050 that comprises one or more of a receiver module 1060, a processor module 1070, and a sender module 1080. The receiver module 1060 may comprise a traffic activity information receiver sub-module that receives traffic activity information associated with a wireless communication device 110. Examples of traffic activity information include an explicit indication of a D2D traffic activity level (e.g., a buffer size, mean bitrate, or average bitrate), an explicit indication of a WAN traffic activity level (e.g., a buffer size or mean bit rate), information from which the D2D traffic activity level may be determined (e.g., implicit D2D traffic activity information), and/or information from which the WAN traffic activity level may be determined (e.g., implicit WAN traffic activity information). The processor module 1070 may include an SCell activation/deactivation sub-module that determines whether to activate or deactivate an SCell based on the traffic activity information. Based on the determination, the SCell activation/deactivation sub-module may instruct the sender module 1080's activation/deactivation command sub-module to send a command to activate or deactivate the SCell. In some embodiments, the modules of general processor 1050 may be implemented in one or more processors 1020 of FIG. 10A.

Certain embodiments may have one or more technical advantages. As an example, certain embodiments allow for reduced or no disruption of D2D operation of D2D capable wireless communication devices configured on an SCell during activation/de-activation of the SCell. Certain embodiments enable efficient use of radio resources by making use of secondary carriers to efficiently operate D2D on that carrier. In certain embodiments, the D2D traffic activity level is taken into account during the SCell activation and deactivation procedure for an SCell on which D2D operation is configured in addition to WAN operation. Particular embodiments may benefit from all, some, or none of the preceding advantages. Other advantages may be evident to one of ordinary skill in the art.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions also may be made to the methods disclosed herein without departing from the scope of the disclosure. The methods may include more, fewer, or other steps. Additionally, steps may be performed in any suitable order.

The above description of the embodiments does not constrain this disclosure. Although this disclosure has been described in terms of certain embodiments, alterations and permutations of the embodiments will be apparent to those skilled in the art. As an example, although certain embodiments have been described in the context of long term evolution (LTE), other embodiments may use LTE-Advanced, UMTS, HSPA, GSM, cdma2000, WiMax, WiFi, and/or other suitable radio access technology or combination of radio access technologies.

The invention claimed is:

1. A method in a wireless communication device capable of device-to-device, D2D, operation and configured with at least one secondary cell, SCell, the method comprising:
   receiving a command from a network node to activate or deactivate the SCell;
   determining at least a D2D traffic activity level of the wireless communication device; and
   determining, by the wireless communication device at the time the command is received, whether to apply or ignore the received command based at least in part on the determined D2D traffic activity level.

2. The method of claim 1, wherein the D2D traffic activity level comprises a D2D buffer size, a D2D mean bitrate, or a D2D average bitrate.

3. The method of claim 1, wherein, if it was determined to apply the received command, the method further comprises introducing a delay prior to applying the received command, the delay based on at least the D2D traffic activity level.

4. The method of claim 1, wherein if the received command is a deactivation command, ignoring the deactivation command or delay applying the deactivation command if the D2D traffic activity level is above a D2D threshold.

5. The method of claim 1, further comprising:
   determining a wireless access network, WAN, traffic activity level of the wireless communication device; and
   wherein the determining whether or not to apply the received command is based in part on the WAN traffic activity level.

6. The method of claim 1, further comprising:
   receiving from the network node a message indicating that the wireless communication device is allowed to autonomously activate or autonomously deactivate the SCell in response to changes in the D2D traffic activity level; and
   autonomously activating or deactivating the SCell in response to changes in the D2D traffic activity level.

7. The method of claim 1, further comprising:
   detecting an increase or decrease in the D2D traffic activity level of the wireless communication device; and
   sending the network node an explicit indication that the network node should activate or deactivate the SCell.

8. The method of claim 1, wherein the D2D traffic activity level is detected for D2D operation on the SCell.

9. A method in a network node for activating or deactivating a secondary cell, SCell, for a wireless communication device capable of device-to-device (D2D) operation and configured with at least one SCell, the method comprising:
   obtaining, by the network node, a D2D traffic activity level of the wireless communication device and a wireless access network (WAN) traffic activity level of the wireless communication device;
   determining, by the network node, whether to activate or deactivate the SCell based at least in part on the D2D traffic activity level and the WAN traffic activity level, wherein the SCell is served to the wireless communication device by the network node or another network node; and
   sending an activation or deactivation command from the network node to the wireless communication device in response to a determination to activate or deactivate the SCell.

10. The method of claim 9, wherein the D2D traffic activity level comprises a D2D buffer size, a D2D mean bitrate, or a D2D average bitrate.

11. The method of claim 9, wherein if the D2D traffic activity level is above a D2D threshold, the method comprises sending the activation command to the wireless communication device or not sending the deactivation command to the wireless communication device.

12. The method of claim 9, further comprising:
   sending the wireless communication device a message indicating whether the wireless communication device is allowed to autonomously activate or autonomously deactivate the SCell in response to changes in the D2D traffic activity level.

13. The method of claim 9, further comprising:
   receiving from the wireless communication device an explicit indication that the network node should activate or deactivate the SCell; and
   activating or deactivating the SCell based on the received indication.

14. A wireless communication device capable of device-to-device (D2D) operation characterized in that the wireless communication device comprises a processor and a memory containing instructions executable by said processor, the wireless communication device, upon execution of the instructions by the processor, being operable to:
   receive a command from a network node to activate or deactivate at least one secondary cell, SCell; determine at least a D2D traffic activity level of the wireless communication device; and
   determine, by the wireless communication device at the time the command is received, whether to apply or ignore the received command based at least in part on the determined D2D traffic activity level.

15. The wireless communication device of claim 14, wherein the D2D traffic activity level comprises a D2D buffer size, a D2D mean bitrate, or a D2D average bitrate.

16. The wireless communication device of claim 14, wherein, if it was determined to apply the received command, the wireless communication device is further operable to introduce a delay prior to applying the received command, the delay based on at least the D2D traffic activity level.

17. The wireless communication device of claim 14, wherein if the received command is a deactivation command, the wireless communication device is operable to ignore the deactivation command or delay applying the deactivation command if the D2D traffic activity level is above a D2D threshold.

18. The wireless communication device of claim 14, further operable to:
    determine a wireless access network, WAN, traffic activity level of the wireless communication device; and
    wherein the determination whether or not to apply the received command is based in part on the WAN traffic activity level.

19. The wireless communication device of claim 14, further operable to:
    receive from the network node a message indicating that the wireless communication device is allowed to autonomously activate or autonomously deactivate the SCell in response to changes in the D2D traffic activity level; and
    autonomously activate or deactivate the SCell in response to changes in the D2D traffic activity level.

20. The wireless communication device of claim 14, further operable to:
    detect an increase or decrease in the D2D traffic activity level of the wireless communication device; and
    send the network node an explicit indication that the network node should activate or deactivate the SCell.

21. The wireless communication device of claim 14, wherein the D2D traffic activity level is detected for D2D operation on the SCell.

22. A network node for activating or deactivating a secondary cell, SCell, for a device-to-device (D2D) capable wireless communication device, the network node characterized by a processor and a memory containing instructions executable by said processor, the network node, upon execution of the instructions by the processor, being operable to:
    obtain, at the network node, a D2D traffic activity level of the wireless communication device and a wireless access network (WAN) traffic activity level of the wireless communication device;
    determine, at the network node, whether to activate or deactivate the SCell based at least in part on the D2D traffic activity level and the WAN traffic activity level, wherein the SCell is served to the wireless communication device by the network node or another network node; and
    send an activation or deactivation command from the network node to the wireless communication device in response to a determination to activate or deactivate the SCell.

23. The network node of claim 22, wherein the D2D traffic activity level comprises a D2D buffer size, a D2D mean bitrate, or a D2D average bitrate.

24. The network node of claim 22, wherein if the D2D traffic activity level is above a D2D threshold, the network node is operable to send the activation command to the wireless communication device or not send the deactivation command to the wireless communication device.

25. The network node of claim 22, further operable to:
    send the wireless communication device a message indicating whether the wireless communication device is allowed to autonomously activate or autonomously deactivate the SCell in response to changes in the D2D traffic activity level.

26. The network node of claim 22, further operable to:
    receive from the wireless communication device an explicit indication that the network node should activate or deactivate the SCell; and
    activate or deactivate the SCell based on the received indication.

* * * * *